Jan. 8, 1924. 1,480,402

R. KROLLAGE

MOTOR FUEL AND COOLING SYSTEM

Filed March 3, 1922   2 Sheets-Sheet 1

Inventor
Rudolph Krollage
By Jack Ashley
Attorney

Jan. 8, 1924. 1,480,402
R. KROLLAGE
MOTOR FUEL AND COOLING SYSTEM
Filed March 3, 1922 2 Sheets-Sheet 2
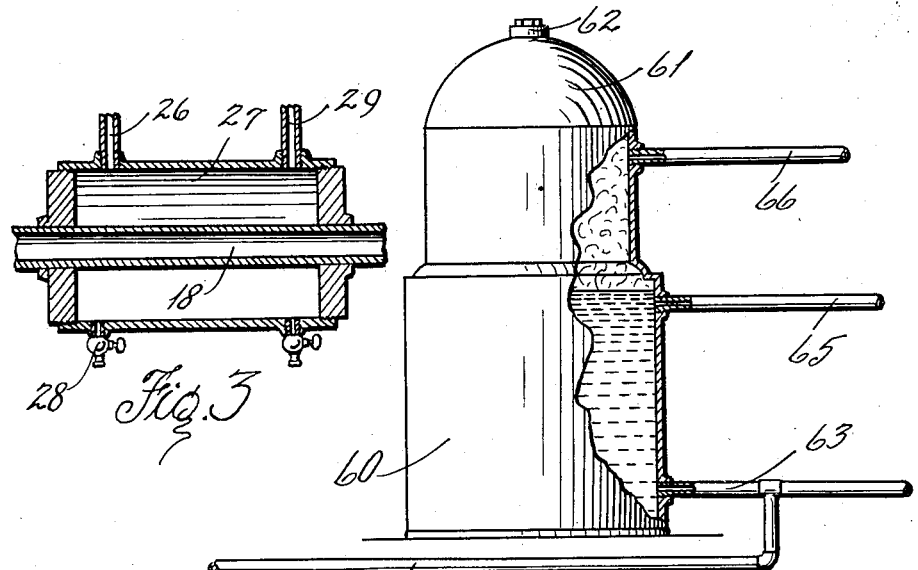
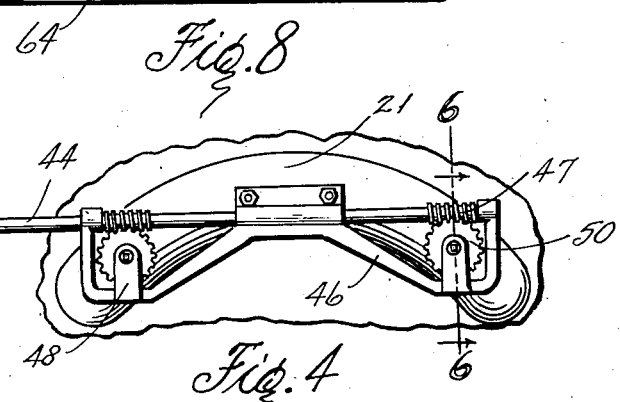
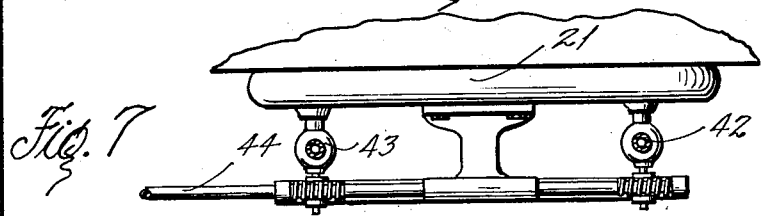
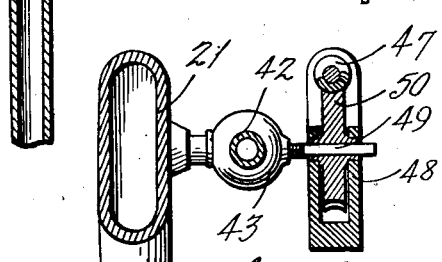
Inventor
Rudolph Krollage
By Jack Ashley
Attorney Patented Jan. 8, 1924.

1,480,402

UNITED STATES PATENT OFFICE.

RUDOLPH KROLLAGE, OF McGREGOR, TEXAS, ASSIGNOR OF ONE-EIGHTH TO MARTIN A. JONES, OF McGREGOR, TEXAS.

MOTOR FUEL AND COOLING SYSTEM.

Application filed March 3, 1922. Serial No. 540,909.

*To all whom it may concern:*

Be it known that I, RUDOLPH KROLLAGE, a citizen of the United States, residing at McGregor, in the county of McLennan and State of Texas, have invented certain new and useful Improvements in Motor Fuel and Cooling Systems, of which the following is a specification.

This invention relates to new and useful improvements in motor fuel and cooling systems.

The object of the invention is to provide a system for utilizing a heavy hydrocarbon oil as fuel for an internal combustion engine and at the same time employing said oil in the cooling system in the place of water or air.

A particular object of the invention is to use a heavy hydro-carbon oil such as crude oil in the circulatory cooling system which includes the radiator and jacket of a motor; together with means for heating, like fuel oil and introducing it in the circulatory system so as to replenish the same without materially reducing the temperature and at the same time introducing air, whereby the oil in the circulatory system in aerated and a gaseous vapor produced in a chamber provided for this purpose.

A still further object is to convey this gaseous vapor from its collection chamber and introducing it into the intake manifold of the motor, whereby a highly combustible and efficient fuel is provided. One of the features resides in introducing the heated fuel oil into the circulatory system at a plurality of points whereby it is broken up and more readily gasified. A further object is to provide a safety outlet for the gaseous vapors which will operate under an excessive pressure and convey said vapors back into the fuel line so that the same will not be wasted.

A construction designed to carry out the invention will be hereinafter described together with other features of the invention.

Figure 1:
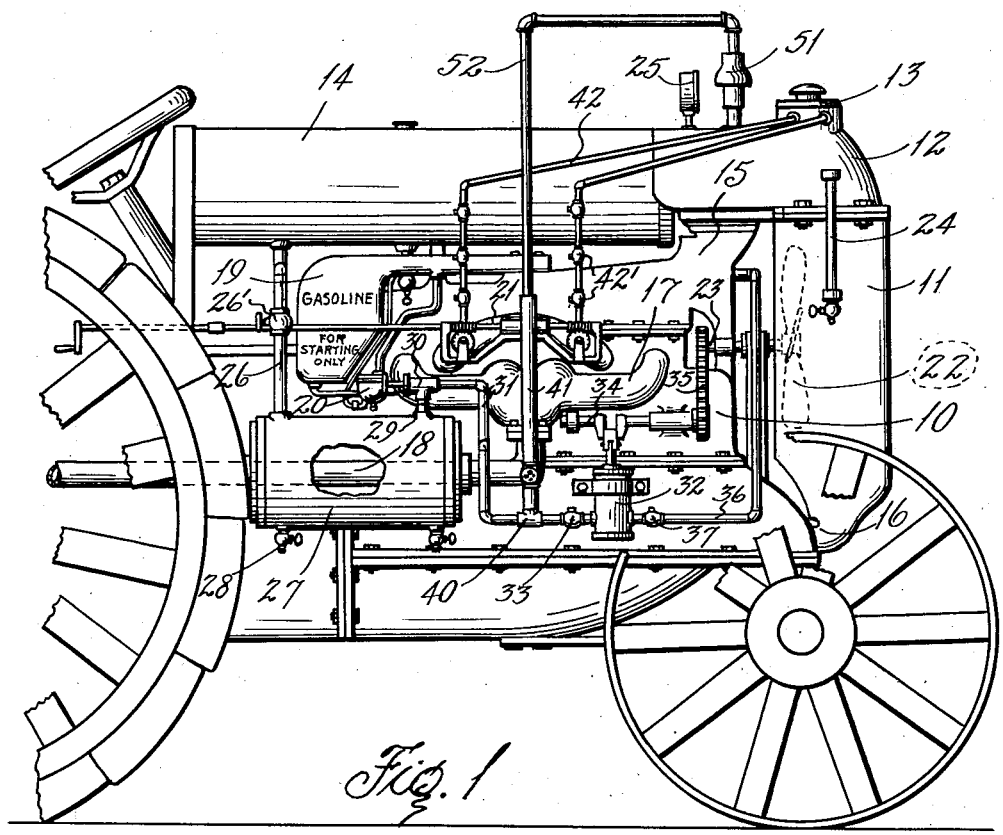
Figure 2:
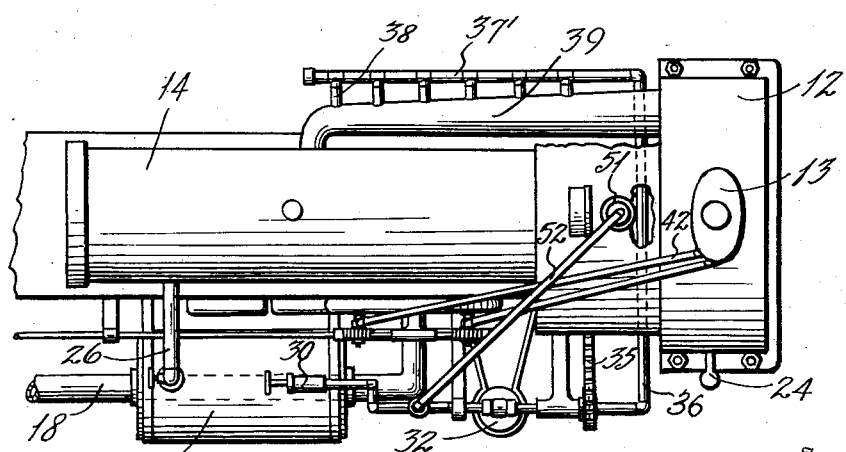

The invention will be more readily understood from a reading of the following specification and by reference to the accompanying drawings, in which an example of the invention is shown and wherein:

Fig. 1 is a side elevation of a tractor equipped with a structure embodying my invention, Fig. 2 is a partial plan view of the same, Fig. 3 is a longitudinal sectional view of the pre-heating drum, Fig. 4 is a plan view of the intake manifold mechanism, Fig. 5 is an elevation of the same, Fig. 6 is an enlarged cross section on the lines 6—6 of Fig. 5, Fig. 7 is a vertical sectional detail view of the air admitting pipe, and Fig. 8 is a view of a modified form of construction, partly in elevation and partly in section.

In the drawings the numeral 10 designates the block of a motor which contains the usual cylinder surrounded by the ordinary circulatory jacket. A radiator 11 is mounted in front of the block and is provided with a top tank 12 having a filling cap 13. A fuel tank 14 is mounted over the block. The circulatory jacket of the block communicates with the tank 12 by a connection 15 and with the radiator by a connection 16 at the lower end thereof. The usual exhaust manifold 17 and exhaust pipe 18 are provided. A gasoline tank 19 is mounted on the side of the block and is connected with a carburetor 20 which in turn is suitably connected with an intake manifold 21. A fan 22 is mounted on the rear of the radiator and is provided with a shaft 23 which is driven in the usual manner. The parts which have been described form the elements of a well known make of tractor and are not a part of the invention, but are merely accessories thereto. It is to be understood in carrying out the invention the same may be applied to any make of tractor which employ a cooling system involving a circulating fluid and a radiator.

In applying my invention to the tractor, I provide a glass gauge 24 which I mount on the side of the radiator so that its upper end connects with the tank 12 of the center thereof. I provide the cap 13 with a suitable gasket or other means whereby a pressure tight joint may be had. A pressure gauge 25 is mounted on top of the tank. I remove the kerosene burning carburetor and extend a fuel pipe 26 from the bottom of the tank 14 to the top of a cylindrical drum 27. This drum surrounds the exhaust pipe 18 and is provided with drain cocks 28 in its bottom. Crude oil or other hydro-carbon liquid fuel is placed in the tank 14, and supplied to the drum thru the pipe 26, which has a controlling valve 26'. The oil received in the drum will be heated and will flow out thru a nipple 29 which is connected with a needle valve 30, the latter being adjusted to control the flow of the oil. A fuel pipe 31 extends from the valve 30 and is smaller than the pipe 26 so as to assure the filling of the drum and a proper passage of the oil.

The pipe 31 is connected with a suitable pump cylinder 32 and includes a check valve 33 adjacent said pump. The pump is operated by a crank shaft 34 mounted on the side of the block 10 and driven by means of a chain 35 from the fan shaft 23. Another feed pipe 36 leads from the pump cylinder and includes a check valve 37. These valves are arranged alternately so that when one is closed the other is open as is obvious. The pipe 36 extends upwardly and passes between the block and the radiator and is connected on the opposite side with a manifold 37' which has a plurality of spaced nipples 38 connected in the return manifold 39 of the circulatory jacket of the block.

The radiator and tank 12 are filled with crude oil, or other fuel oil, by removing the cap 13. The oil level is brought to the point shown in Fig. 1, and will be indicated in the gauge 24. The cap 13 is replaced and sealed in a suitable manner as by a packing gasket. This leaves a space at the top of the tank above the oil level which forms a vaporizing chamber or dome.

Between the valve 30 and the check valve 33, a T-joint 40 is connected in the pipe 31 and receives the lower end of the sleeve 41. The upper end of this sleeve is open to admit air which is drawn down thru the sleeve and introduced into the oil which is flowing thru the pipe 31. The oil which is pumped thru the pipe 36 is not only heated, but is aerated and this promotes vaporization. By passing the aerated oil from the manifold 37' thru the multiplicity of nipples 38, said oil is broken up and is more readily gasified. The aerated oil is caused to circulate thru the jacket and radiator and pass thru the body of oil which is previously introduced to the same, whereby the temperature of the body of oil is raised and gaseous vapors formed in the tank 12 at which point the discharge from the jacket of the motor enters. These gaseous vapors form an excellent fuel and may be introduced directly into the motor cylinders without employing a carburetor.

The gaseous vapors which are collected in the dome of the tank 12 are conveyed thru pipes 42 to regulating valves 43 which are mounted at each end of the intake manifold 21. In each pipe 42, a plurality of check valves 42' are connected for preventing back fire from the motor passing to the dome. In order that the valves 43 may be easily adjusted and in unison, I provide a worm shaft 44, having a crank 45 on its rear end and mounted on the block 10. The shaft is supported in a bracket 46 mounted on the manifold 21 and has worms 47 integral therewith. The bracket has upstanding yokes 48 in which the extended hubs of worm gears 50 are journalled. These gears mesh with the worms and are revolved thereby. The stems 49 of the valves are angular in cross section and pass snugly thru the gears so as to be rotated by the gears. The valves 43 are of the globe type in which the stems are threaded, so that by rotating said stems the valves are opened and closed. The crank 45 is within easy reach of the driver and he may readily adjust the valves 43 to control the supply of fuel to the motor.

It is obvious that means must be provided for relieving excess pressure from the dome 13, which pressure is indicated by the gauge 25. A pressure release valve 51 of any suitable construction is connected in the top of the tank 12 and arranged to release at a given pressure, the vapors or gases, to a pipe 52. The pipe 52 passes down into the sleeve 41. It is obvious that the cold air which passes into the sleeve will cause a condensation of the gases and the condensate will pass down into the pipe 31.

In using the apparatus the carburetor 20 is supplied with gasoline from the tank 19 in the usual manner. The charge from the carburetor is drawn into the manifold 21 and the motor operated in the ordinary way. The exhaust passing thru the pipe 18 will heat the drum 27. Crude oil or other fuel liquid is placed in the tank 14, and fed to the drum thru the pipe 26; the radiator and motor jacket having been filled with the same character of fuel oil. The oil in the circulatory system is circulated whereby the motor is cooled and the temperature of said oil raised. The hottest oil will be discharged from the jacket thru the connection 15 into the top tank 12 and in a short time after the motor has been started the oil in the tank 12 will begin to vaporize and the gauge 25 will indicate a pressure.

When this condition is reached the needle valve 30 is opened so as to cause the heated oil from the drum to flow into the pipe 31. This oil being heated will be more fluent and easily handled by the pump 32. As the oil passes thru the T-joint 40, it is admixed with air from the sleeve 41 and is thus aerated. The aerated oil is pumped thru the pipe 36 to the manifold 37' and ejected thru the nipples 38. By discharging the oil thru the many nipples, it is broken up and more readily gasified. This aerated and heated oil being introduced directly into the jacket at the bottom thereof, and being of less specific gravity that the oil returning from the radiator, will pass upward thru said circulating oil until it reaches the hotter strata at the top. The air thus admitted passes into the dome and mixes with the vapors or gases being generated therein. The vapors or gases from the dome are conveyed thru the pipes 42 to the intake manifold 21, its flow being regulated by the valves 43. By this system a carburetor is eliminated and only combustible gases are admitted to the motor, which makes for a great saving in fuel consumption.

It will be seen that the oil from the tank 14 is preheated and aerated, so upon entering the circulating body of oil it will have a tendency to pass up thru the same and promote vaporization, rather than retard the same. At the same time oil in the circulatory or cooling system will be replenished. The hot oil passing from the top tank 12 down thru the radiator 11 will be cooled and in this manner excessive heat from the motor will be dissipated.

In Fig. 8, I have shown a modified form of construction that may be used in place of an ordinary radiator as described, or in connection with stationary engines or the like which are not equipped with a suitable fluid containing tank in their circulatory system. The modification comprises a rectangular receptacle 60 which is reduced at its upper end to form a vaporizing chamber or dome 61 having a filling opening 62. A pipe 63 or other conductor of suitable design leads from the lower portion of the receptacle to the engine jacket. The aerated and heated oils passing thru the pump 32 are conducted to the pipe 63 by means of a pipe 64. The hottest oils circulate from the engine jacket to the upper portion of the receptacle thru a suitable connection 65. It is obvious that gaseous vapors are thus generated in the dome 61 in a manner such as has been hereinbefore described. From the dome said gases are conducted to the intake manifold of the engine by means of a pipe 66 or the like, as is also obvious.

Various changes and modifications may be made within the scope of the appended claims and without departing from the spirit of the invention.

What I claim, is:

1. In a motor fuel system, the combination with a radiator and circulatory jacket of a motor, of a preheating receptacle, the radiator and jacket containing a body of fuel oil, the radiator having a vapor dome at its upper end, means for supplying fuel oil to the receptacle, a conductor extending from the receptacle for conveying the preheated fuel oil to the jacket, and means for admitting air into the fuel oil conductor, said conductor including a manifold having means for introducing said preheated fuel oil and air into the said jacket at a plurality of points.

2. In a motor fuel system, the combination with a radiator and circulatory jacket of a motor, of a preheating receptacle, the radiator and jacket containing a body of fuel oil, the radiator having a vapor dome at its upper end, means for supplying fuel oil to the receptacle, a conductor extending from the receptacle for conveying the preheated fuel oil to the jacket, means for admitting air into the fuel oil conductor, said conductor including a manifold having means for introducing said preheated fuel oil and air into the said jacket at a plurality of points, and means for conveying the gaseous vapors from said dome directly into the intake manifold of the motor.

3. In a motor fuel system, the combination with a motor jacket and radiator containing a body of fuel oil circulated therethru as a cooling agent, a vapor dome above the body of oil, of means for introducing a preheated fuel oil into the circulating body of oil for generating gaseous vapors in the dome and replenishing the body of oil, a safety outlet in said dome adapted to operate under excessive pressure, and means connected with the outlet for conveying the released vapors back into the system so that the same will not be wasted.

4. In a motor fuel system, the combination with a radiator and circulatory jacket of a motor, of a preheating receptacle, the radiator and jacket containing a body of fuel oil, the radiator having a vapor dome at its upper end, means for supplying fuel oil to the receptacle, a conductor extending from the receptacle for conveying the preheated fuel oil to the jacket, means for admitting air into the fuel oil conductor, said conductor including a manifold having means for introducing said preheated fuel oil and air into the said jacket at a plurality of points, an air compressor connected in said conductor for admitting air thereinto and conveying said preheated fuel oil and air under pressure, said conductor including a manifold having means for introducing said preheated fuel oil and air into the said jacket at a plurality of points, and other conductors extending from the vapor dome for introducing the gaseous vapors directly into the intake manifold of the motor, said conductors including means for preventing ignition of the vapors in said dome by back fire from the motor.

5. In a motor fuel system, the combination with a radiator and circulatory jacket of a motor, of a preheating receptacle, the radiator and jacket containing a body of fuel oil, the radiator having a vapor dome at its upper end, means for supplying fuel oil to the receptacle, a conductor extending from the receptacle for conveying the preheated fuel oil to the jacket, means for admitting air into the fuel oil conductor, said conductor including a manifold having means for introducing said preheated fuel oil and air into the said jacket at a plurality of points, an air compressor connected in said conductor for admitting air thereinto and conveying said preheated fuel oil and air under pressure, said conductor including a manifold having means for introducing said preheated fuel oil and air into the said jacket at a plurality of points, other conductors extending from the vapor dome for introducing the gaseous vapors directly into the intake manifold of the motor, said conductors including means for preheating ignition of the vapors in said dome by back fire from the motor, and means for controlling the passage of said gaseous vapors to said intake manifold.

In testimony whereof I affix my signature.

RUDOLPH KROLLAGE.